United States Patent [19]

Spenadel et al.

[11] 4,170,664

[45] Oct. 9, 1979

[54] RESILIENT RADIATION-CURABLE AUTOMOTIVE BODY COMPONENTS

[75] Inventors: Lawrence Spenadel, Westfield; S. Alexander Banks, Cranford, both of N.J.

[73] Assignee: Exxon Research & Engineering Co., Florham Park, N.J.

[21] Appl. No.: 924,360

[22] Filed: Jul. 13, 1978

[51] Int. Cl.² .......................... C08F 8/00; C08F 18/00
[52] U.S. Cl. ........................ 427/44; 204/159.17; 204/159.19; 260/33.6 AQ; 260/42.33; 260/42.47; 260/42.53; 428/413; 428/425; 428/483; 428/516; 252/511
[58] Field of Search ............... 204/159.15, 159.17; 427/44, 34

[56] References Cited

U.S. PATENT DOCUMENTS

| | | | |
|---|---|---|---|
| 3,915,928 | 10/1975 | Leibu | 260/42.18 |
| 3,959,521 | 5/1976 | Suetsugi et al. | 427/44 |
| 4,044,187 | 8/1977 | Kremkau | 428/212 |
| 4,070,497 | 1/1978 | Wismer et al. | 427/44 |
| 4,113,895 | 9/1978 | Watt et al. | 427/44 |

OTHER PUBLICATIONS

Prepelka et al., Reaction Injection Molding in the Automotive Industry, Journal of Cellular Plastics, Mar.-/Apr. 1975, pp. 87-98.

*Primary Examiner*—Richard B. Turer
*Attorney, Agent, or Firm*—Harvey L. Cohen

[57] ABSTRACT

A process for the production of cross-linked resilient automotive body components having a cured surface coating from a thermoplastic elastomeric composition substantially free from added vulcanizing or free-radical inducing agents comprises: Fabricating an uncured component from said composition; applying to the component a radiation-curable surface coating; and simultaneously curing the surface coating and cross-linking the composition comprising the fabricated component by exposing the coated component to high-energy ionizing radiation.

39 Claims, No Drawings

RESILIENT RADIATION-CURABLE AUTOMOTIVE BODY COMPONENTS

BACKGROUND OF THE INVENTION

1. Field of the Invention

This invention relates to a process for the production of cross-linked resilient automotive body components having a cured surface coating. More particularly, this invention is concerned with a process for the production of resilient automotive body components suitable for use as automotive fascia, fender extensions, grilles and the like from an injection-moldable or extrudable thermoplastic elastomeric composition which is free from added vulcanizing agents such as reactive sulfur compounds, quinones, halogenated compounds and reactive resins or free-radical inducing agents such as peroxides and azo compounds.

Most particularly, this invention relates to a process for the production of automotive body components which comprises: fabricating an uncured component by injection molding, thermoforming, stamping from a formed sheet or fabrication processes well known in the art, a composition comprising a uniform mixture of one or more interpolymers comprising ethylene and propylene, one or more homopolymers of a $C_2$ to $C_6$ alpha-olefin, one or more multifunctional vinylic or allylic monomers, and optionally a quantity of one or more medium to high structure forms of carbon black sufficient to both reinforce the component and to render the fabricated component electrically conductive; applying a radiation-curable decorative surface coating to the uncured component, preferably by electrostatic means; and simultaneously curing the surface coating and cross-linking the composition comprising the fabricated component by exposing the coated component to high-energy ionizing radiation.

Recently, the need for improved fuel economy in the operation of automobiles has led to smaller cars and automotive manufacturers lowering the weight of automobiles by substituting steel, particularly in the body, with light metal alloys and polymeric compositions. Currently, automotive companies are developing elastomeric structures (fascia) for the front and rear ends of automobiles to replace the present steel fender extensions, radiator grilles and the like. These structures are required to flex on impact in concert with energy absorbing devices and return, undamaged, to their original shape when the distorting forces are released. In addition, the structure must readily accept paint and the finished surface must have adequate weather resistance and show a minimum of marking or marring on impact and recovery.

Suitable and commercially acceptable resilient body components must not only be capable of being amenable to mass production methods, as by conventional injection-molding techniques, but the finished product must possess the necessary physical properties of high flexural stiffness, high tensile strength, hardness, ability to recover rapidly to its original state when deformed and to be mar and tear resistant. In addition, the fascia structures can also be finished by applying a decorative surface coating by electrostatic means; there said structures should be electrically conductive and must not undergo deformation during the paint curing operation.

2. Prior Art

Currently, two principal types of polymeric compositions being used for the fabrication of resilient body components are exemplified first by U.S. Pat. No. 3,915,928 in which the composition comprises an injection moldable mixture of a crystalline copolymer of ethylene and propylene or a terpolymer of ethylene, propylene and a non-conjugated diolefin; carbon; from about 5 to about 30 weight percent of chopped glass fibers; and sulfur-based vulcanizing agents. The presence of the glass fibers in the composition may result in an abrasion of the mold surfaces and parts molded from this composition show "trail" lines due to alignment of the glass fibers at the surface and the parts must be routinely sanded and buffed prior to painting in order to produce acceptable automotive fascia.

In the other, in which the end product is a microcellular polyurethane, described in a paper by Prepelka and Wharton "Reaction Injection Molding in the Automotive Industry," Journal of Cellular Plastics, p. 87, March/April 1975, the cost of the components comprising the composition is higher than the cost of hydrocarbon based elastomers and production of the polyurethane structures requires specialized metering and mixing equipment and presses.

Most recently, resilient automotive body components have been produced from a composition and by a process disclosed in U.S. patent application Ser. No. 864,340 filed Dec. 27, 1977, which is hereby incorporated by reference, in which a first mixture of crystalline interpolymers comprised of ethylene and propylene, a low-density polyethylene and carbon is uniformly mixed to form a second mixture with one or more vinylic or allylic monomers and a particular type of an organic peroxide at a temperature below 130° C. and said second mixture is injection molded and cross-linked in the mold at elevated temperatures.

Cross-linking of thermoplastic and elastomeric polymers by exposure to high-energy ionizing radiation is old in the art. A sampling of recent U.S. Patents and literature which illustrate the art are: U.S. Pat. Nos. 3,911,202, 3,988,227, 3,990,479, and articles in Modern Plastics, p. 55 (1974); T. G. Mysiewicz; Plastics Technology, p. 51 (1977); Business Week, p. 38B, July 11, 1977; Morganstern & Becker, "The Technology and Economics of Radiation Curing," Rubber Division, A.C.S. Cleveland, Ohio, May 1975; R. F. Grossman "Compounding For Radiation Cross-Linking," 1st International Meeting on Radiation Processing, Puerto Rico, May 1976; Smidle, "Radiation," Rubber & Plastics News 13, Sept. 19, 1977; "Radiation Processing Branches Out," Modern Plastics, October 1976; and Bohm et al, "Comparison of Radiation and Sulfur Cured Elastomers," Radiation Dynamics, Inc. Publication 1976.

Curing decorative coatings applied to vulcanized substrates by exposure to high-energy ionizing radiation is also old in the art. A sampling of patents and literature which illustrate the art are: U.S. Pat. Nos. 3,773,638, 3,809,569; 3,560,245; British Pat. Nos. 1,182,079; 1,264,579 and articles by S. E. Young, "The Curing of Organic Coatings By High Energy Radiation Processes," in Progress in Organic Coatings 4, 225–49 (1976) and J. C. Mileo, "Coating Compositions Cross-linkable by Electronic Bombardment," Rev. Inst. Franc. Petrole 31, 665–85 (1976).

SUMMARY OF THE INVENTION

This invention is concerned with a process and the product made by said process for the production of cross-linked resilient automotive body components having a cured surface coating, suitable for use as automotive fascia, which comprises:

(a) Forming a component, as for example by injection molding, from a composition comprised of a uniform mixture of unvulcanized elastomeric interpolymers selected from the group consisting of crystalline or semi-crystalline copolymers of ethylene and propylene and crystalline or semi-crystalline terpolymers of ethylene, propylene and a $C_6$ to $C_{10}$ non-conjugated diolefin and mixtures of said copolymers and terpolymers; one or more homopolymers of a $C_2$ to $C_6$ alpha-olefin and mixtures thereof; one or more multifunctional vinylic or allylic monomers; and optionally from about 0.5 to about 150 parts of a low to high structure form of carbon, such as carbon black, per hundred parts by weight of said composition; said composition being substantially free of added reagents which induce cross-linking or vulcanization;

(b) Applying to said component, preferably by electrostatic means, a radiation-curable surface coating; and (c) Simultaneously cross-linking the composition comprising the component and curing the surface coating by exposing the coated component to high-energy ionizing radiation.

Where carbon black is used in order to improve the resistance of said composition to ultraviolet (U.V.) radiation degradation, from about 0.5 part of a low to high structure forms of said carbon black per hundred parts by weight of said composition is employed. In applications where a surface coating is to be applied by electrostatic means, from about 15 to about 150 parts of a medium to high structure form of said carbon black per hundred parts by weight of said composition are employed.

The products made by the process of this invention are particularly useful in the automotive field for fascia, e.g., fender extensions and grilles; in such applications the surface coating can be decorative as well as functional.

DESCRIPTION OF PREFERRED EMBODIMENTS

A. Polymers

1. Elastomers

Elastomeric copolymers of ethylene and propylene which are useful for the process and products of this invention contain from about 35 to about 90 weight percent of ethylene, preferably 55 to 85 weight percent of ethylene; possess a crystalline content in the range of about 0 to 40 weight percent, have number average molecular weights ($\bar{M}n$) of about 35,000; a molecular weight distribution stated as the ratio of weight average molecular weight ($\bar{M}w$) to ($\bar{M}n$) of about 25; and a Mooney Viscosity, ML(1+8) at 127° C. in the range of about 10 to about 40, preferably 13 to 27.

Useful elastomeric terpolymers of ethylene, propylene and a non-conjugated $C_6$ to $C_{10}$ diolefin, non-limiting examples of which include 1,4-hexadiene, 5-ethylidene-2-norbornene and dicyclopentadiene; contain from about 35 to 90 weight percent of ethylene; from about 0.5 to 5.0 weight percent of non-conjugated diolefin; $\bar{M}n$ in the range of about 15,000 to about 80,000; $\bar{M}w/\bar{M}n$ in the range of about 2.5 to 30; a crystalline content in the range of about 0 to 40 weight percent; and Mooney Viscosities, ML(1+8) at 127° C. in the range of about 10 to 20. ($\bar{M}w$ and $\bar{M}n$ by gel permeation chromatography, GPC, methods well known in the art).

The ethylene content of the elastomers may be determined by the method of Gardner, Cozewith and Ver Strate; Rubber Chem. & Tech. 44, 1015 (1971). Crystallinity may be determined by the method of Ver Strate and Wilchinsky; J. Polymer Sci. A-2, 9, 127 (1971). A general review covering the preparation, physical properties and a listing of commercially available polymers has been published by Baldwin and Ver Strate: "Polyolefin Elastomers Based on Ethylene and Propylene", Rubber Chem. & Tech. 45, 710–881 (1972).

2. Homopolymers of alpha-olefins

Homopolymers suitable for use in the invention are $C_2$–$C_6$ alpha olefin homopolymers. Non-limiting examples of poly-alpha olefins which are suitable for the practice of this invention include low-density and high-density polyethylene, polypropylene, polybutene-1, poly-4-methyl pentene-1 and mixtures thereof. Preferred are low-density polyethylene having a density of 0.92 g/cm³ or less and a melt index in the range of about 0.5 to about 25, preferably 12 to 22; and polypropylene having a melt flow rate in the range of about 0.5 to 20, preferably about 5 to about 14 when measured by ASTM D-1238-65T (Cond.L).

B. Multifunctional Vinylic and Allylic Monomers

Non-limiting examples of vinylic and allylic monomers which are suitable for the practice of this invention include those monomers having two or more vinylic or allylic groups such as divinyl benzene, trivinyl benzene, 2,3-divinyl pyridine, divinylsulfone, 2,5-divinyl-6-methylpyridine, ethylene glycol dimethacrylate, trimethylolpropane trimethacrylate, 1,2-propanediol dimethacrylate, diallyl maleate, diallyl phthalate, diallyl cyanurate, and triallyl cyanurate. Preferred is trimethylolpropane trimethacrylate.

C. Carbon Black

Carbon blacks suitable for the practice of this invention include medium to high structure blacks which are capable of reinforcing the cross-linked structure and when used in an amount equal to about 15 to about 150 parts by weight per 100 parts of said composition yield components having sufficient electrical conductivity to permit coating the uncured component by electrostatic means.

In applications where electrostatic coating is not used a low to high structure carbon black can be optionally added for the purpose of functioning as an absorber of ultraviolet (U.V.) radiation as is well known in the art. In such applications said carbon black is used in an amount equal to about 0.5 to about 14 parts, preferably about 1 to 5 parts by weight per 100 parts of said composition.

Useful carbon blacks may be further characterized as those having a nitrogen surface area in the range of about 30 to 1000 square meters per gram and a DBP absorption (ASTM D-2414) of about 60 to 350 ml per 100 grams. Non-limiting examples of suitable blacks are the ASTM D-2516 types N-100 and N-200, and grades N-326, N-330, N-339, N-347, N-351, N-440, N-472, N-539, N-550, N-650, N-660, N-762, N-765 and Ketjen Black EC a highly electrically conducting black available from Armak Co., (Division of Akzona Inc.)

D. Radiation-Curable Surface Coatings

A large number of radiation-curable surface coatings which may be applied by spray painting on non-electroconductive substrates or by electrostatic means on electroconductive substrates have been disclosed in patents and extensively described in the scientific and trade literature, a sample of which has been noted in the citations of the prior art. Preferred are high solids pigmented acrylic, unsaturated polyester, polyurethane and epoxy coatings which not only cure by exposure to radiation but are grafted onto the substrate when exposed to ionizing radiation.

E. Preferred Radiation-Curable Compositions

Injection-moldable, radiation-curable compositions which are suitable for the production of automotive components by the process of this invention comprise a uniform mixture of 100 parts by weight of an elastomeric interpolymer selected from the group consisting of copolymers of ethylene and propylene containing from about 35 to about 90 weight percent of ethylene and possessing a crystalline content in the range of about 0 to about 40 weight percent and terpolymers of ethylene, propylene and a $C_6$ to $C_{10}$ non-conjugated diolefin containing from about 35 to 90 weight percent of ethylene and possessing a crystalline content in the range of about 0 to 40 weight percent; from about 50 to about 150 parts by weight of a homopolymer of an alpha-olefin selected from the group consisting of polyethylene having a density of 0.92 g./cm$^3$ or less and a melt index in the range of about 0.5 to 25, preferably 12 to 22, and polypropylene having a melt flow rate in the range of about 0.5 to 20, preferably about 5 to 14; from about 15 to 150 parts by weight of a medium to high structure carbon black, said carbon black having a nitrogen surface area in the range of about 30 to 1,000 square meters per gram and a DBP absorption (ASTM D-2414) of about 60 to about 350 ml per 100 grams; and from 1 to 20 parts by weight of a multifunctional vinylic or allylic monomer, preferably ethylene glycol dimethacrylate or trimethylolpropane trimethacrylate.

Optionally, plasticizers, mold release agents, and antioxidants may be added to the composition to facilitate mixing and molding and to stabilize the molded component against degradation.

F. Process Conditions

In distinction to prior art processes for the production of automotive body components utilizing polymeric compositions containing vulcanizing agents such as sulfur compounds, or free-radical inducing agents such as peroxides and azo compounds, which require the composition to be mixed at low temperatures in order to prevent premature cross-linking, the compositions useful in the process of the instant invention are free of added agents of the said vulcanizing or free radical inducing agents and the components comprising the preferred composition may be mixed at temperatures conventionally used in the rubber and plastics industry.

The polymers may be master-batched in a Banbury mixer at a temperature above the crystalline melting point of the polymers utilized, for example at a temperature in the range of about 180° C. to 200° C., the carbon black added and dispersed uniformly at the same temperature, followed by plasticizers, mold release agents and antioxidants when used. The multifunctional vinylic or allylic monomer is finally added at a temperature below the point where excessive volatilization of low boiling monomers would take place. For convenience in subsequent injection molding the composition may be extruded and pelletized.

Injection molding of the composition may be conducted at temperatures which range between about 100° C. and 225° C., at pressures in the range of 100 to 3000 psi, depending on the rheology of the composition, into a mold maintained at a temperature in the range of about 10° C. to 90° C. at which temperature the molded component is readily removed from the mold without encountering the lower hot tear strength of cross-linked or vulcanized components which are injection molded in molds maintained at temperatures in the range of about 180° C. to 210° C.

The uncured molded component has a smooth surface which does not require sanding or buffing prior to coating which may be done by spray or electrostatic means using a radiation-curable surface coating; where preferred, said coating can be decorative.

The surface coating and the molded component are then simultaneously cured by subjecting the coated component to ionizing radiation in the range of 2.5 to 30 megarads (Mrads).

G. Radiation Cross-linking

Electron beam radiation equipment in a diversity of basic designs, voltages and currents is available on the market from a number of manufacturers. An overview of the types of equipment and suppliers has been published in the articles listed in the prior art section of the instant specification.

H. Properties

Compositions suitable for the production of automotive fascia by injection molding techniques must possess a rheology which will permit the fabrication of structures which may be as large as 170 cm by 80 cm by 1 cm. When attempts are made to injection mold elastomers, very high pressures must be used, as contrasted to thermoplastics, since as a general rule elastomers have a much higher viscosity than thermoplastics at the same temperature. The difficulties in the use of elastomers for the production of fascia are made more severe since fascia structures are required to have high flexural strength. To achieve high flexural strength with most elastomers usually requires that the elastomers be compounded with large amounts of reinforcing fillers. The addition of fillers increases the viscosity of the compounded elastomer so that the use of injection molding for fabrication requires impractically high injection pressures. Use of fillers which do not appreciably increase the viscosity of the compounded stock, yields structures which do not meet the required physical properties. Attempts to obtain the necessary stiffness by the incorporation of a substantial quantity of glass fiber has not been too satisfactory since the molded part usually shows the flow pattern of the glass fiber on its surface and the part requires extensive sanding and buffing before painting.

A major object of this invention is a process for the production of cross-linked automotive body components having a cured surface coating from elastomeric-thermoplastic compositions in which the uncured compositions possess a rheology suitable for the fabrication of automotive fascia by injection molding techniques and thereafter applying a radiation-curable surface coating and simultaneously curing the surface coating and cross-linking the molded component by subjecting the coated component to high-energy ionizing radiation; the coated component has a fluexural modulus in the range of about 20,000 to 30,000 psi at room temperature and in the uncured state prior to painting has an electroconductivity suitable for painting by electrostatic means.

We have now found that a uniform mixture of: one or more elastomeric polymers comprising ethylene and propylene; one or more homopolymers of a $C_2$ to $C_6$ alpha-olefin; one or more multifunctional vinylic or allylic monomers; and a medium to high structure carbon black in an amount sufficient to render an uncured molded component made from the mixture electrostatically conductive possesses a rheology which permits the mixture to be injection-molded through small orifices into a mold cavity at temperatures and pressures conventionally used in the injection-molding industry and when coated with a radiation-curable coating and cured and cross-linked by high-energy ionizing radiation possesses a surface finish and flexural strength suitable for use in the fabrication of automotive body components.

In prior art compositions comprising a thermoplastic homopolymer of an alpha olefin, an elastomer comprising ethylene and propylene, and a peroxide cross-linking agent the choice of said thermoplastic homopolymer of an alpha-olefin is in general limited to low-density polyethylene in view of its low melting point, and the use of polypropylene is precluded since it undergoes chain scission in the presence of peroxides. In contrast intermediate and higher density polyethylenes and polypropylene may be employed in the process of the instant invention.

The product that is obtained from a mixture of an elastomeric ethylene-propylene polymer with a thermoplastic homopolymer such as low-density polyethylene in which the mixture has been cross-linked with a free-radical inducing agent such as a peroxide is different from the product obtained when the same mixture is cross linked by means of high-energy radiation. In the case of peroxide cross-linked mixtures, cross-linking takes place at a temperature which is higher than the crystalline melting point of either polymer with an attendant suppression of the crystallinity and melting point. The irradiation cross-linked mixture is cross-linked at a temperature well below the crystalline melting point, whereby the crystalline character of the polymers is not only largely retained but the irradiated product shows an increased resistance to stress-crack attack.

While the physical properties desired in automotive fascia have not been finalized by the manufacturers, the best estimate of the property requirements from published information is as follows:

TABLE I

| PHYSICAL PROPERTIES OF AUTOMOTIVE FASCIA | |
|---|---|
| Property | Requirement |
| Tensile at Failure, psi (ASTM D-638) | 1500 Min. |
| Ultimate Elongation, % (ASTM D-638) | 150 Min. |
| Tear Strength, psi (ASTM D-624) | 300 Min. |
| Flex. Modulus, psi (ASTM D-790) | |
| at −28° C. | 100,000 Max. |
| at 23° C. | 20–30,000 |
| at 70° C. | 7,000 Min. |
| Flex. Set, Chevrolet CTZ-ZZ003[d] | |
| Degrees after 5 minutes | 15 Max. |
| Heat Sag, Chevrolet CTZ-ZZ006[b] | |

TABLE I-continued

| PHYSICAL PROPERTIES OF AUTOMOTIVE FASCIA | |
|---|---|
| Property | Requirement |
| Cm at 121° C. | 4 Max. |

Notes:
[d]The Chevrolet Flexural Recovery of Elastomeric Materials Test CTZ-ZZ003 measures the ability of an elastomeric material to recover after being bent 180 degrees around a 0.50 inch mandrel at room temperature. Good recovery of fascia structures after impact is essential. An injection molded sample measuring 5" × 1" × 1" is bent 180° and the angle of recovery measured after 5 minutes. A specimen that returns to its original position has a flexural set of 0 degrees, while a specimen that recovers only halfway has a flexural set of 90 degrees.
[b]The Chevrolet High Temperature Sag of Elastomeric Materials Test CTZ-ZZ006 measures the Sag from the horizontal in cm. of an injection molded specimen measuring 6" × 1" × 1" clamped with a 4 inch overhang and heated at a specified temperature in a circulating hot-air oven for 1 hour.

This invention will be further understood by reference to the following examples which include but are non-limiting to preferred embodiments of the instant invention.

EXAMPLE 1

Fifty parts by weight of an ethylene-propylene copolymer which comprised 65 percent by weight of ethylene and had a crystalline content of 11.5 weight percent, a $\overline{M}n$ of 35,000 and a Mooney Viscosity (1+8) at 127° C. of 27 was master batched in a Banbury mixer at 180° C. for 5 minutes with 50 parts by weight of a low-density polyethylene having a melt index of 21; 50 parts by weight of a high-structure general purpose furnace carbon black and 0.2 parts by weight of zinc stearate. The mixture was cooled to about 130°–150° C. and 2.5 parts by weight of trimethylolpropane trimethacrylate uniformly dispersed throughout the mixture.

Using the above composition, test specimens measuring 6"×1"×⅛" were injection molded in a Boy injection molding machine (sold by Boy Machine Inc., Plainview, N.Y.) having a 5 ounce capacity and equipped with a reciprocating screw and a 100 ton clamp. Conditions during the molding operation were as follows:

Cylinder Temperatures:
Rear—221° C.
Center—221° C.
Front—221° C.
Nozzle—250° C.
Mold Temperature—23° C.
Injection Pressure 650 psi
Screw-Back Pressure 100 psi The test specimens were readily removable from the mold and were conditioned at room temperature for 24 hours before exposing the samples to radiation.

The injection molded test specimens were irradiated in increments of 2.5 Megarads (Mrads), the radiation being directed toward one surface of each specimen. For total dosage levels of 5.0, 10, 15 and 30 Mrads by means of a Radiation Dynamics, Inc. Dynamitron. This electron beam accelerator has its high direct current voltage developed by means of cascaded rectifiers which are powered from a radio frequency oscillator. The electron source is a thermionic cathode. A 3.0 Mev., 25 MA machine was used in these tests. Tensile strengths of the irradiated samples are given in Table II.

TABLE II

| TENSILE STRENGTHS OF IRRADIATED SAMPLES | |
|---|---|
| Dosage in Mrads | Tensile Strength |
| 0 | 1730 psi |
| 5.0 | 1950 psi |

TABLE II-continued

| TENSILE STRENGTHS OF IRRADIATED SAMPLES | |
|---|---|
| Dosage in Mrads | Tensile Strength |
| 10.0 | 2160 psi |
| 15.0 | 2250 psi |
| 30.0 | 2675 psi |

Physical inspections on samples which had been irradiated at 10.0 Mrads are compared with uncured samples in Table III.

TABLE III

| ELECTRON BEAM CROSS-LINKING | | |
|---|---|---|
| | Uncured | 10 Mrads |
| Shore D Hardness | | |
| Initial/15 sec. | 45/36 | 47/39 |
| Tensile Strength, psi | 1730 | 2160 |
| Elongation, % | 295 | 245 |
| 100% Modulus, psi | 1545 | 1705 |
| Flexural Modulus, psi | 26,200 | 25,000 |
| 5 Min. Flexural Set, Degrees | 20 | 15 |
| Gel, wt. % | 6 | 77 |
| Chev. Heat Sag at 121° C. cm | 6.0 | 3.7 |

EXAMPLE 2

Fifty-five parts by weight of a terpolymer of ethylene, propylene and ethylidene norbornene containing 65 weight percent of ethylene and 3.5 weight percent of ethylidene norbornene was mixed with 33 parts by weight of a paraffinic oil (Type 104B-ASTM D-2226); 45 parts by weight of polypropylene having a density of 0.9 and a melt flow rate of 5.0 (ASTM D-1238-65T Cond. L,) 50 parts by weight of a type N-660 carbon black, 3.4 parts by weight of trimethylolpropane trimethacrylate (75% active on filler), and 1 part by weight of Mold-Wiz 11A, a proprietary mold release agent (sold by Axel Plastics Res. Lab. Inc., New York, N.Y.) in a Banbury mixer to a uniform composition and test specimens injection molded in the Boy machine in the same manner as in Example 1.

Table IV gives the results obtained when the test samples were irradiated in the Dynamitron at increments of 2.5 Mrads for totals of 5, 10 and 15 Mrads.

TABLE IV

| ELECTRON BEAM IRRIDATION OF FASCIA COMPOUND | | | | |
|---|---|---|---|---|
| Dose, Mrads | 0 | 5 | 10 | 15 |
| Tensile, psi | 1390 | 1660 | 1550 | 1510 |
| % Elongation | 465 | 440 | 385 | 310 |
| Flexural Modulus, psi × $10^3$ | 18.2 | 18.9 | 19.0 | 18.8 |
| Flexural Set, Degrees | 18.0 | 16.5 | 16.0 | 15.5 |
| Chevy, Heat Sag-cm. | 2.6 | 1.5 | 1.3 | 1.2 |
| % Gel | 0.6 | 11.9 | 26.2 | 34.8 |

EXAMPLE 3

Eighty-eight parts by weight of an oil extended terpolymer of ethylene, propylene and ethylidene norbornene containing 68 weight percent of ethylene and 4.5 weight percent of ethylidence norbornene was mixed with 50 parts by weight of polypropylene having a density of 0.9 and a melt flow rate of 5.0; 3.4 parts by weight of trimethylolpropane trimethacrylate (75% active on filler); and 1 part by weight of Mold-Wiz 11A, a proprietary mold release agent (sold by Axel Plastics Res. Lab. Inc. New York, N.Y.), in a Banbury mixer to a uniform mixture and test specimens injection molded in the Boy machine in the same manner as in Example 1. The oil extended terpolymer contained 57 percent by weight of polymer and 43 percent by weight of an ASTM D-2226, Type 104-B paraffinic oil.

Table V gives the results obtained when the test specimens were irradiated in the Dynamitron at increments of 2.5 Mrads for totals of 5, 10 and 15 Mrads.

TABLE V

| ELECTRON BEAM IRRADIATION OF FASCIA COMPOUND | | | | |
|---|---|---|---|---|
| Dose, Mrads | 0 | 5 | 10 | 15 |
| Tensile, psi | 1330 | 1440 | 1500 | 1530 |
| % Elongation | 390 | 380 | 310 | 280 |
| Flexural Modulus, psi × $10^3$ | 21.8 | 24.1 | 24.4 | 24.7 |
| Flexural Set, degrees | 19.5 | 18.5 | 17.0 | 15.0 |
| Chevy, Heat Sag-cm. | 1.6 | 1.1 | 0.8 | 0.7 |

EXAMPLE 4

Uncured, injection molded test specimens prepared in Examples 1, 2 and 3 are coated with an acrylic based radiation curable paint and after air drying are exposed at various dosage levels to ionizing radiation, whereby the paint and the test specimen are cured and cross-linked. Physical inspections of the irradiated coated specimens are substantially the same as those obtained on the uncoated samples.

What is claimed is:

1. A process for the production of cross-linked automotive body components having a cured surface coating comprises:
   (a) fabricating an uncross-linked component from a composition comprising a uniform mixture of one or more elastomeric interpolymers comprising ethylene and propylene, one or more thermoplastic homopolymers of a $C_2$ to $C_6$ alpha-olefin, and one or more multifunctional vinylic or allylic monomers;
   (b) applying a radiation-curable surface coating to said component, and
   (c) simultaneously curing the surface coating and cross-linking the component composition by irradiating the coated component with high-energy ionizing radiation.

2. Process according to claim 1 wherein said elastomeric interpolymer is a copolymer of ethylene and propylene.

3. Process according to claim 1 wherein said elastomeric interpolymer is a terpolymer of ethylene, propylene and a $C_6$ to $C_{10}$ non-conjugated diolefin selected from the group consisting of 1,4-hexadiene, ethylidene norbornene and dicyclopentadiene.

4. Process according to claim 1 wherein said thermoplastic homopolymer is polyethylene having a density of 0.92 g./cm$^3$ or less.

5. Process according to claim 1 wherein said thermoplastic homopolymer is polypropylene.

6. Process according to claim 1 wherein said cured surface coating is decorative.

7. Process according to claim 1 wherein the radiation applied to said component is in the range of 2.5 to 30 megarads.

8. The irradiated product of claim 1.

9. The irradiated product of claim 2.

10. The irradiated product of claim 3.

11. The irradiated product of claim 4.

12. The irradiated product of claim 5.
13. The irradiated product of claim 6.
14. A process for the production of cross-linked resilient automotive body components having a cured surface coating comprises:
 (a) fabricating an uncross-linked component from a composition comprising a uniform mixture of one or more elastomeric interpolymers comprising ethylene and propylene, one or more thermoplastic homopolymers of a $C_2$ to $C_6$ alpha olefin, one or more multifunctional vinylic or allylic monomers, and a quantity of one or more medium to high structure forms of carbon black sufficient to reinforce the component and render the uncross-linked component electrically conductive;
 (b) applying a radiation-curable surface coating to said component; and
 (c) simultaneously curing the surface coating and cross-linking the component composition by irradiating the coated component with high-energy ionizing radiation.
15. Process according to claim 14 wherein said elastomeric interpolymer is a copolymer of ethylene and propylene.
16. Process according to claim 14 wherein said elastomeric interpolymer is a terpolymer of ethylene, propylene and a $C_6$ to $C_{10}$ non-conjugated diolefin selected from the group consisting of 1,4-hexadiene, ethylidene norbornene and dicyclopentadiene.
17. Process according to claim 14 wherein said thermoplastic homopolymer is polyethylene having a density of 0.92 g./cm$^3$ or less.
18. Process according to claim 14 wherein said thermoplastics homopolymer is polypropylene.
19. Process according to claim 14 wherein said surface coating is decorative.
20. Process according to claim 14 wherein the radiation applied to said component is in the range of 2.5 to 30 megarads.
21. The irradiated product of claim 14.
22. The irradiated product of claim 15.
23. The irradiated product of claim 16.
24. The irradiated product of claim 17.
25. The irradiated product of claim 18.
26. The irradiated product of claim 19.
27. A process for the production of cross-linked resilient automotive body components having a cured surface coating comprises:
 (a) fabricating an uncrosslinked component from a composition comprising a uniform mixture of one or more elastomeric interpolymers comprising ethylene and propylene, one or more thermoplastic homopolymers of a $C_2$ to $C_6$ alpha-olefin, one or more multifunctional vinylic or allylic monomers, and a quantity of one or more low to high structure forms of carbon black sufficient to absorb ultraviolet radiation;
 (b) applying a radiation-curable surface coating to said component; and
 (c) simultaneously curing the surface coating and cross-linking the component composition by irradiating the coated component with high-energy ionizing radiation.
28. Process according to claim 27 wherein said elastomeric interpolymer is a copolymer of ethylene and propylene.
29. Process according to claim 27 wherein said elastomeric interpolymer is a terpolymer of ethylene, propylene and a $C_6$ to $C_{10}$ non-conjugated diolefin selected from the group consisting of 1,4-hexadiene, ethylidene norbornene and dicyclopentadiene.
30. Process according to claim 27 wherein said thermoplastic homopolymer is polyethylene having a density of 0.92 g./cm$^3$ or less.
31. Process according to claim 27 wherein said thermoplastics homopolymer is polypropylene.
32. Process according to claim 27 wherein said surface coating is decorative.
33. Process according to claim 27 wherein the radiation applied to said component is in the range of 2.5 to 30 megarads.
34. The irradiated product of claim 27.
35. The irradiated product of claim 28.
36. The irradiated product of claim 29.
37. The irradiated product of claim 30.
38. The irradiated product of claim 31.
39. The irradiated product of claim 32.

* * * * *